JOHN CLARK.

Improvement in Cars for Carrying Petroleum.

No. 4,788. Reissued March 5, 1872.

Fig. 1

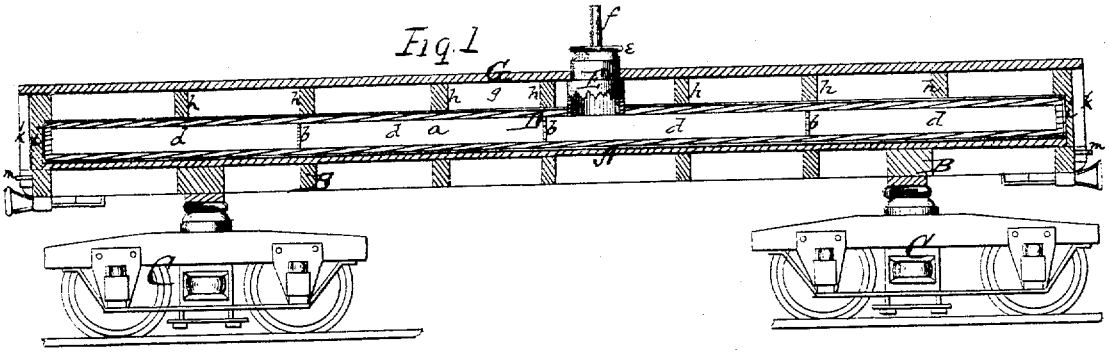

Fig. 2.

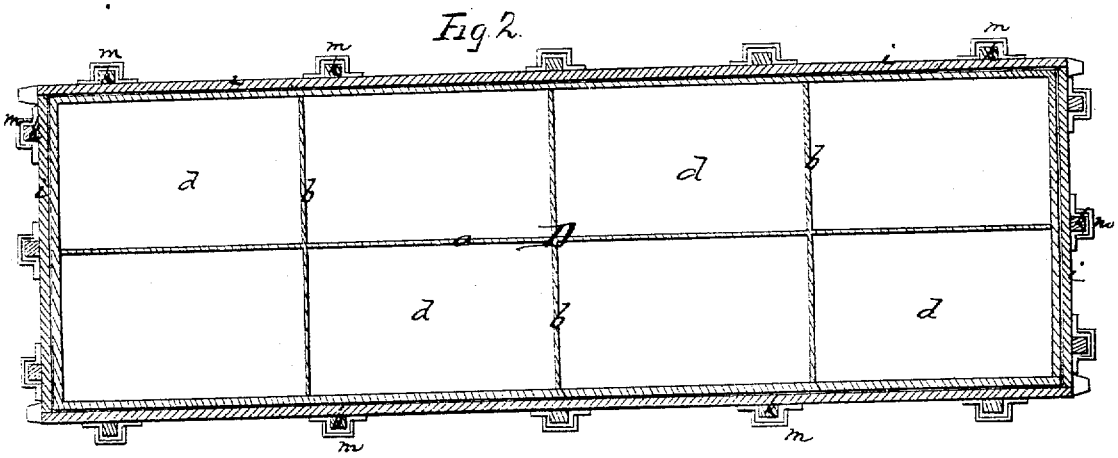

Witnesses:
James E. Hutchinson
T. L. Ewert

Inventor
John Clark.
per Alexander Mason
Attorneys.

4,788.—*Car for Carrying Petroleum.*—JOHN CLARK, Canandaigua, N. Y.—Patent No. 40,458, dated November 3, 1863.

*Claim.*—1. The removable tank D, provided with partitions and used in combination with an ordinary platform-car, substantially as and for the purposes herein set forth.

2. In combination with a shallow tank for carrying petroleum in bulk arranged upon the platform of a railroad car, I claim a movable deck or cover, constructed and arranged substantially and for the purposes herein set forth.

AM. PHOTO-LITHOGRAPHIC CO. N.Y. (OSBORNE'S PROCESS.)

UNITED STATES PATENT OFFICE.

JOHN CLARK, OF CANANDAIGUA, NEW YORK.

IMPROVEMENT IN CARS FOR CARRYING PETROLEUM.

Specification forming part of Letters Patent No. 40,458, dated November 3, 1863; reissue No. 4,788, dated March 5, 1872.

*To all whom it may concern:*

Be it known that I, JOHN CLARK, of Canandaigua, in the county of Ontario and State of New York, have invented certain new and useful Improvements in Cars for Carrying Petroleum, &c., in bulk; and I do hereby declare that the following is a full, clear, and exact description thereof, reference being had to the accompanying drawing and to the letters of reference marked thereon.

The nature of my invention consists, first, in a shallow tank, provided with partitions and used upon an ordinary platform-car, for carrying petroleum in bulk; and, second, in the combination, with a shallow tank for carrying petroleum in bulk arranged upon the platform of a railroad car, of a removable deck or cover, as will be hereinafter more fully set forth.

In order to enable others skilled in the art to which my invention appertains to make and use the same, I will now proceed to describe its construction and operation, referring to the annexed drawing which forms a part of this specification, and in which—

Figure 1 is a longitudinal vertical section, and Fig. 2 a horizontal section of my improved car for carrying petroleum.

A represents the platform of an ordinary dirt or package car, which rests on a frame, B, supported by two or more trucks, C. D is a shallow tank, made of sheet metal or other suitable material of sufficient strength, and impervious to petroleum. This tank extends the entire length and width of the car, and rests upon the platform A. It is also strengthened by one or more longitudinal partitions or bulk-heads, *a*, and transverse partitions or bulk-heads *b*, which divide the interior of said tank into a number of compartments, *d*, so as to obviate the splashing of the oil when the car is in motion. The oil is introduced through a cylindrical spout, E, which extends up through deck of the car, and is closed by a screw-plug, *e*. This plug is provided with a vent-pipe, *f*, to allow the gas to escape which rises from the petroleum, particularly when the same is agitated or when a violent motion is imparted to it. G represents the deck of the car, which is strengthened by two longitudinal timbers, *g g*, attached to its under side near to its edges, and by a series of transverse timbers, *h h*, two of which connect with the ends of the longitudinal timbers *g*, while the balance extends from one of said timbers to the other under the deck at suitable intervals. The timbers *g h* are supported by the sides *i*, which rest upon the platform A close to the sides of the tank D, and are of such a height that the timbers will clear the upper surface of the tank. Standards *k k*, which are firmly secured to the outside of the sides *i i* under the edges of the deck G, and which fit into loops *m* secured to the outside of the frame B, hold the deck, together with the timbers and sides attached to it, in the proper position.

The tank is filled through the spout E, and is emptied through a suitable faucet or faucets. When it has been filled and the spout closed the deck or cover G can be used for carrying dirt, barrels, or any other material or goods precisely as an ordinary platform-car. In the same way, when the tank is empty, the deck may be used for carrying barrels or other materials, or the deck and tank may be removed, when the ordinary platform car remains for any use desired. The tank does, in fact, not interfere with the ordinary functions of the car, and a quantity of petroleum can thus be carried from place to place without incurring the expense of barrels, and perfectly safe from leakage.

Having thus fully described my invention, what I claim as new, and desire to secure by Letters Patent, is—

1. The removable tank D, provided with partitions, and used in combination with an ordinary platform-car, substantially as and for the purposes herein set forth.

2. In combination with a shallow tank for carrying petroleum in bulk arranged upon the platform of a railroad car, I claim a removable deck or cover, constructed and arranged substantially as and for the purposes herein set forth.

In testimony that I claim the foregoing I have hereunto set my hand this 11th day of January, 1872.

JOHN CLARK.

Witnesses:
C. L. EVERT,
JOHN SMITH.